United States Patent [19]

Dempster et al.

[11] 3,924,612
[45] Dec. 9, 1975

[54] SPIROMETER APPARATUS AND METHOD

[76] Inventors: Philip T. Dempster, 322 Key Blvd., Richmond, Calif. 94805; John Y. Pun, 1344 S. 49th St., Richmond, Calif. 94804

[22] Filed: Jan. 28, 1974

[21] Appl. No.: 437,147

[52] U.S. Cl. .............................. 128/2.08; 73/205 L
[51] Int. Cl.² ............................................ A61B 5/08
[58] Field of Search........... 128/2.08, 2.07, DIG. 29; 73/205 L, 194 R

[56] References Cited
UNITED STATES PATENTS

| | | | |
|---|---|---|---|
| 2,916,033 | 12/1959 | Coleman | 128/2.07 |
| 3,509,767 | 5/1970 | Greer | 128/2.08 |
| 3,765,239 | 10/1973 | Olsson | 128/2.08 |
| 3,797,479 | 3/1974 | Graham | 128/2.08 |

FOREIGN PATENTS OR APPLICATIONS

| | | | |
|---|---|---|---|
| 850,750 | 10/1960 | United Kingdom | 128/2.08 |

*Primary Examiner*—Richard A. Gaudet
*Assistant Examiner*—Lee S. Cohen
*Attorney, Agent, or Firm*—Flehr, Hohbach, Test, Albritton & Herbert

[57] ABSTRACT

A spirometer using an open-end flow pneumotach with a flow restriction to create a pressure elevation in proportion to flow. A pressure sensitive transducer creates an electrical signal in proportion of the pressure elevation which is then measured by a sample and hold circuit. The transducer is bypassed to atmospheric pressure by a gas chopper at an approximately 25 cycle per second rate. A zeroing circuit references the base line of a transducer amplifier output to zero each time the transducer is bypassed to atmosphere. Chopper position sensing and synchronizing circuits connect the output signal from the transducer amplifier to the zeroing circuit and to the sample and hold circuit during the reference and signal positions of the chopper respectively.

9 Claims, 2 Drawing Figures

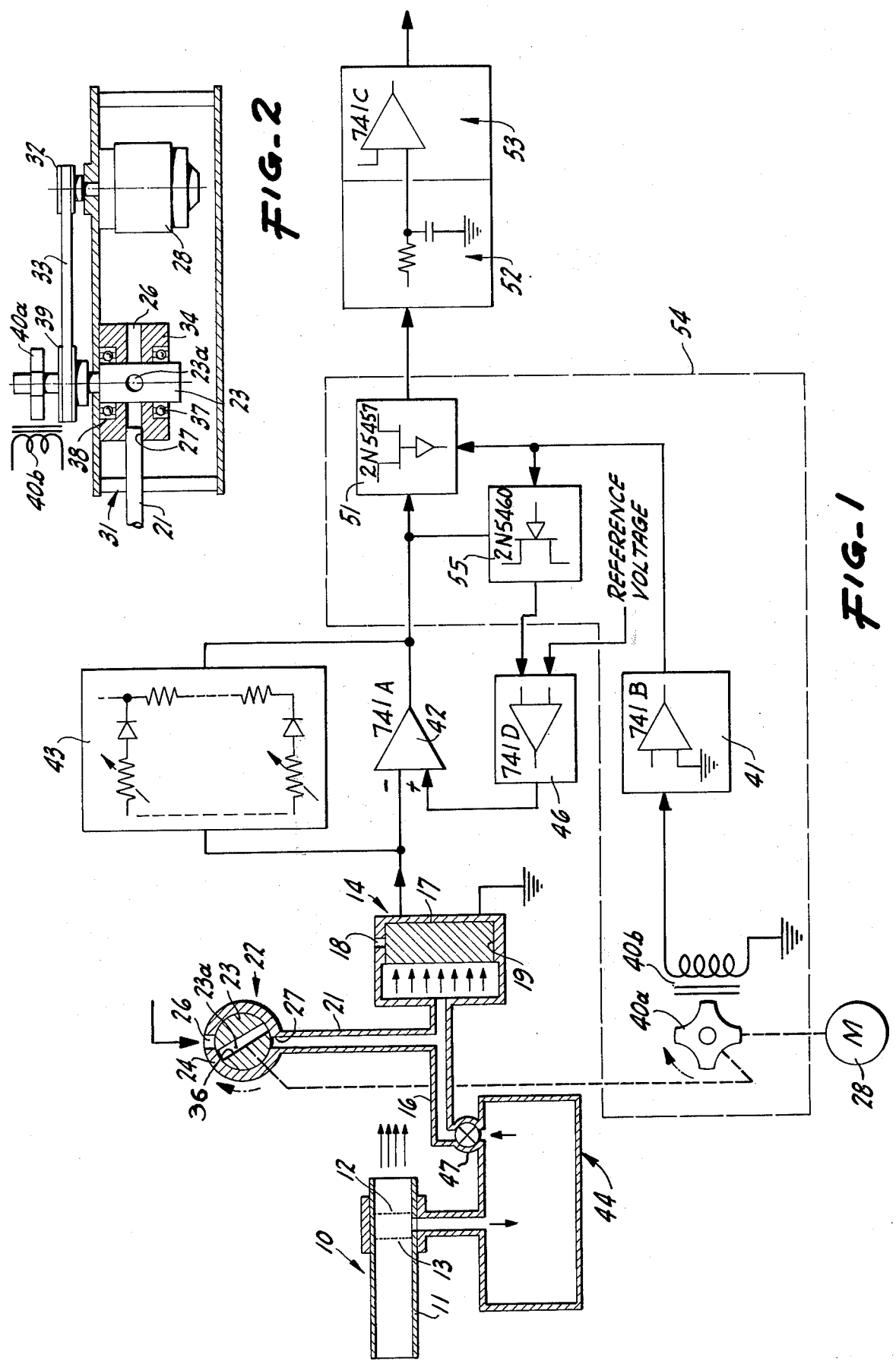

SPIROMETER APPARATUS AND METHOD

Background of the Invention

This invention relates to pulmonary function measuring devices and more particularly to spirometers. In a general sense, the invention relates to the measurement of gas flow in an open-ended flow system.

There are two basic types of spirometers commonly used in pulmonary function evaluation, closed volume and open-end flow. Instruments of the closed volume displacement type (immersed bell, piston, or hinged bellows) are known for high accuracy in volume studies and gas concentration measurements. Unfortunately, their resistance to air flow (inherent in mechanical displacement devices due to inertia, friction, and surface tension) produces low measurements of respiratory flow and to a lesser degree forced expiratory volume and, excessive size and weight limit their usefulness as portable instruments.

More recently introduced instruments of the open-end flow rate type (heated wire and thermister sensors), while offering little resistance to air flow and characterized by compactness and portability, suffer a multitude of inaccuracies. Sensitivity to environmental temperatures over a period of time, severe nonlinearity prior to compensation, lack of absolute base line constancy, and questionable accuracy over a wide dynamic range prevent accurate integration of flow rate for volume computation over the broad dynamic range encountered in pulmonary function testing. Absolute base line constancy, low hysteresis, and wide dynamic range are prime requisites for accurate measurements of any kind. This is particularly true for volume measurements in pulmonary function testing, not only is a broad dynamic range encountered, but high accuracy across the entire flow spectrum is essential for valid volume integration.

Known systems are also insufficiently accurate at extremely small flow rates and accordingly are quite sensitive to base line drift which leads to the aforementioned errors in integrating the flow rate to obtain volume. There is, therefore, a need for a new and improved spirometer for pulmonary measurements.

Summary of the Invention and Objects

It is a general object of the present invention to provide a pulmonary function spirometer and method which will overcome the above limitations and disadvantages by offering the advantages of both basic types of spirometers without the disadvantages of either.

Another object of the invention is to provide a spirometer and method of the above character which is substantially insensitive to base line drift over a wide dynamic range.

Another object of the invention is to provide a spirometer and gas flow measuring instrument of the above character in which pressure difference between the signal under measurement and a reference signal is measured by switching rapidly between them with a gas flow chopper and measuring the difference in output.

In general, the spirometer and gas flow measuring instrument of the present invention operate utilizing a rotary air pressure chopper which alternately grounds the input to a pressure transducer at a rapid rate. The electrical difference in output is measured between the reference level taken at atmospheric pressure from the transducer and that produced by the slight pressure caused by the flow of gas through a restrictive device in a pneumotach. The air chopper is synchronized with an electronic circuit such that when the transducer is grounded to atmospheric pressure the electronic circuit is driven to zero reference base line by a base line zeroing integrator. When the chopper is closed permitting the transducer to measure the pressure elevation caused by the screen, the output of the transducer is passed to a sample and hold circuit and buffer amplifier for smoothing the sampled output into a continuous signal, the value of which is proportional to the flow rate through the pneumotach.

These and other objects and features of the present invention will become apparent from the following description when taken in conjunction with the accompanying drawings and claims.

Brief Description of the Drawings

FIG. 1 is a schematic diagram of the spirometer constructed in accordance with the present invention.

FIG. 2 is an elevational view partly in diagramatic form of mechanical air chopper constructed in accordance with the present invention for use in the apparatus of FIG. 1.

Detailed Description of the Preferred Embodiment

Referring now to FIGS. 1 and 2, there is shown a schematic drawing of the spirometer constructed in accordance with the present invention which includes a pneumotach 10 consisting of an elongate tube 11 having a disposable mouthpiece at one end forming an open-ended flow channel for the expiration of a patient. Means is provided for forming a restriction and consists of a screen 12 disposed across the channel which serves to develop a slight pressure increase proportional to flow through the pneumotach. Other restriction means are also suitable, such as an elongated channel structure having a honeycomb like cross-section. A second screen 13 is incorporated in the flow channel ahead of screen 12 to reduce turbulence in the gas flow. A pressure sensitive transducer 14 is connected through suitable tubing 16 to the pneumotach in the region between the first and second screens and thereby receives the increase in pressure caused by the second screen. The transducer is of a strain-gauge or capacitance type which produces an output electrical signal in response to a differential pressure thereacross and is accordingly maintained with atmospheric pressure on one side 17 through a port 18 and receives an increase in pressure against its other surface 19.

Means is provided for momentarily referencing the transducer to atmospheric pressure by a bypass line connected in parallel with the transducer and containing a rotary chopper 22. The general schematic arrangement is illustrated in FIG. 1 which shows the chopper consisting of a shaft 23 passing through a housing 24 having an outlet port 26 open to atmospheric pressure and an inlet port 27 connected to the bypass line 21. Shaft 23 includes a channel or port 23a which aligns with ports 26, 27 during its rotation. The chopper is driven by an electric motor 28 at a speed of about 12 revolutions as second to given an approximate 20–25 cycle chopping frequency. One suitable mechanical arrangement is illustrated in FIG. 2 which shows a framework 31 mounting motor 28 the output of which is taken from a pulley 32 and belt 33. The chopper includes a mounting block 34 having a channel 36 formed therethrough which is interrupted by shaft 23 mounted in bearings 37, 38. A suitable pulley 39 is mounted on shaft 23 to complete the linkage to the motor pulley 32. The shaft also carries a position indicating disk 40a for changing the flux of a magnetic circuit. Disk 40a can for example be a four pole magnet.

Means is provided for sensing the position of the port of shaft 23 and consists of a magnetic circuit including a core and winding 40b mounted in proximity to disk 39. The output of the winding is coupled to the input of a position sensing amplifier 41 which gives a positive or negative going pulse depending upon the flux change induced by the rotating magnetic field of the disk.

Means is provided for amplifying and linearizing the output of the transducer and consists of an operational amplifier 42 one input of which is connected to the transducer. A control circuit 43 is provided for linearizing the output consisting of a parallel connected series of variable resistances and diodes interconnected through a voltage dropping resistive network a portion of which is illustrated in FIG. 1. The other input of transducer amplifier 42 is connected to a base line zeroing integrator 46 circuit the purpose of which will be described hereinafter.

The ideal output of the amplifier is a series of square pulses referenced to a steady base line and having a height above the base line proportional to the strength of the gas flow through the pneumotach. In practice, however, there is overshoot and rounding of the pulse due to conditions in the chopping circuit and also due to mechanical resonance and response characteristics of that circuit. In order to overcome this and to create a substantially square wave an accumulator 44 is incorporated in series between the pneumotach and the transducer. The accumulator has a volume of significant size relative to the pressure caused by the gas flow and is provided with a finely adjustable output orifice valve 47. In operation, an oscilliscope is temporarily connected to the output of transducer amplifier 42 and valve 47 is adjusted to obtain a square wave form having minimum rounding and overshoot.

The output of the amplifier is taken through an FET signal switch 51 which delivers a sampling pulse to a sample and hold circuit 52 and buffer amplifier 53 and then to conventional signal processing circuitry and read-outs (not shown). The sample and hold circuit includes an input series connected load resistor and a large value capacitor. The resistor and capacitor values are such that considerable smoothing of the input signal is obtained, the capacitor being charged during each sample interval and retaining the charge value until the next sampled value is received. Buffer amplifier 53 functions as a unity gain isolation amplifier the output of which is relatively smooth signal, the DC value of which is proportional to the flow rate.

Synchronizing means 54 are provided for establishing a voltage base line referenced to the value of the signal received during the period in which the chopper is grounded to atmospheric pressure. Means 54 includes the position sensor and chopper amplifier 41 which drives an FET switch 55 connected in series between the transducer amplifier and the sample and hold circuit. This is done in synchronism with the received pulses so that the signal appearing at the output of the transducer amplifier 42 is delivered to the sample and hold circuit 52 only during the closed period pulse of the chopper. An FET zeroing switch of the opposite polarity to switch 51 is connected from the transducer amplifier to the zeroing integrator circuit and is driven into a conduction when the chopper is open, i.e., the chopper is grounded to atmosphere. The zeroing integrator senses the input signal when grounded and compares it to a reference value, as an adjustable voltage source. If the reference value is greater or less than the input it provides a compensating voltage which is used as a reference voltage for the other input to transducer amplifier 42.

With the foregoing spirometer construction considerable improvement in the performance of expiration flow rate and other pulmonary functions of a patient can be made. The instrument provides absolute base line constancy over reasonable period of time, has a wide dynamic range for flow rate measurement and undetectible hysteresis. Also the calibration constancy as a function of changes in ambient temperature is extremely low, making the spirometer constructed in accordance with the present invention quite stable.

To those skilled in the art to which the present invention pertains, many modifications and adaptations will occur. For example, while the reference pressure is taken as atmospheric for the spirometer device disclosed herein, it is obvious that the references can be anything relevant. Thus, if used for in-line gas flow measurements the reference could be taken from one side of the flow channel in which the pneumotach is located. Accordingly, the specific disclosures herein should be taken as an example of a specific form of the present invention and not as a limitation thereon.

We claim:

1. In a spirometer, a pneumotach, and pressure transducer connected to said pneumotach for developing an electrical signal in response to pressure changes, chopper means connected in parallel between said input to said transducer and atmospheric pressure to thereby alternately open and close the transducer input between a position reference to atmosphere and a position referenced to the pressure received from said pneumotach, means for continuously operating said chopper means between the open and closed positions, means for amplifying the electrical signals received from said transducer, and circuit means for sensing the position of said chopper means and for synchronously driving said amplifying means to a reference base line whenever said chopper means is opened to reference atmospheric pressure.

2. Apparatus for measuring the flow of a gas, comprising an open-ended flow channel for carrying said gas, restriction means disposed across the flow path of said channel to develop a pressure increase before said restriction means as a function of the amount of flow therethrough, a pressure responsive transducer connected to the channel to receive the increase in pressure caused by said restriction means and sensitive to said pressure increase to develop an electrical signal in response thereto, air chopper means connected parallel to said transducer for intermittently opening the input to said transducer to atmospheric pressure so that a series of pressure pulses is generated the strength of which is proportional to the pressure difference referenced from atmospheric to that developed by said restriction means, means for continuously operating said air chopper means between the open and closed positions, amplifier means connected to said transducer for amplifying the output thereof, zeroing means for driving the output of said amplifier to zero base line, synchronizing means for sensing the position of said air chopper means and connecting the output of said transducer means to said amplifier means during a portion of time in which said air chopper is in a closed position and for connecting said zeroing means to the input of said amplifier means whenever said chopper means is in the open position, said amplifier means including sample and hold means for developing a smooth and continuous signal the value of which is proportional to the strength of the last pulse received.

3. Apparatus as in claim 2 further including an accumulator disposed between the flow channel and said transducer and having an outlet valve for adjusting the gas pressure transmission between the channel and the transducer.

4. Apparatus as in claim 2 in which said synchronizing means includes means for developing first and second signals indicative of the open and closed positions of said chopper means, a first electronic switch connected between the output of said amplifier means and said sample and hold means and having control element means responsive to said first signal for closing said first switch to said sample and hold means, and a second electronic switch connected between the ouput of said amplifier and said zeroing means and having control element means responsive to said second signal for closing said second switch to said zeroing means.

5. Apparatus as in claim 2 in which said chopper means includes a shaft, a mounting block and having bearing means associated therewith for mounting said shaft for rotation, said block having a gas flow channel therein interrupted by said shaft and connected to the input to said transducer at one end and atmospheric pressure at the other end, said shaft having a port therethrough which passes into and out of alignment with said channel, and means for rotating said shaft.

6. Apparatus as in claim 5 in which said synchronizing means includes a magnetic position sensor comprising a magnetically asymmetric disk mounted for rotation on said shaft, means forming a magnetic circuit for sensing the position of said disk.

7. Apparatus as in claim 6 in which said disk is a four pole magnet.

8. A method for measuring the flow of a gas through an open-end flow channel having restriction means disposed across said channel to develop the pressure elevation before said restriction as a function of the amount of flow therethrough comprising the steps of sensing said pressure difference and developing an electrical signal response thereto, continuously and intermittently interrupting said sensing step and sensing the atmospheric pressure as a reference, zeroing the electrical signal whenever atmospheric pressure is sensed, generating a series of pulses the strength of which is proportional to the pressure difference between atmospheric and that of said flow channel, amplifying said series of pulses, sampling said pulses and developing a smooth signal the value of which is proportional to the strength of the last pulse received, and synchronizing the input prior to said sampling step.

9. Method as in claim 8 in which said interrupting step is operated at approximately 25 cycles per second.

* * * * *